(12) United States Patent
Bak et al.

(10) Patent No.: US 10,394,897 B2
(45) Date of Patent: *Aug. 27, 2019

(54) VISUALIZATION OF SERIAL PROCESSES

(71) Applicant: International Business Machines Corporation, Armonk, NY (US)

(72) Inventors: Peter Bak, Haifa (IL); Matthias Kormaksson, Rio de Janeiro (BR); Yuval Nardi, Kiryat Anavim (IL); Gilad M. Saadoun, Haifa (IL); Harold J. Ship, Mitzpe Netofa (IL)

(73) Assignee: International Business Machines Corporation, Armonk, NY (US)

( * ) Notice: Subject to any disclaimer, the term of this patent is extended or adjusted under 35 U.S.C. 154(b) by 854 days.

This patent is subject to a terminal disclaimer.

(21) Appl. No.: 14/851,513

(22) Filed: Sep. 11, 2015

(65) Prior Publication Data

US 2017/0076010 A1 Mar. 16, 2017

(51) Int. Cl.
*G06F 16/904* (2019.01)
*G06F 16/28* (2019.01)

(52) U.S. Cl.
CPC .......... *G06F 16/904* (2019.01); *G06F 16/285* (2019.01)

(58) Field of Classification Search
None
See application file for complete search history.

(56) References Cited

U.S. PATENT DOCUMENTS 7,003,079 B1 * 2/2006 McCarthy ........... H04M 3/2227
379/265.02
8,306,797 B2 11/2012 Furem et al.
8,887,286 B2 11/2014 Dupont et al.
(Continued)

FOREIGN PATENT DOCUMENTS

EP 1866714 B1 3/2010

OTHER PUBLICATIONS

Abdallah, Ali E., "A Graphical Tool for the Visualization and Animation of Communicating Sequential Processes", Department of Computer Science, The University of Reading, Reading, RG6 6AY, UK, 8 pages, printed on Nov. 19, 2015, <http://citeseerx.ist.psu.edu/viewdoc/download?doi=10.1.1.110.5460&rep=rep1&type=pdf>.

(Continued)

*Primary Examiner* — Amresh Singh
(74) *Attorney, Agent, or Firm* — Bryan D. Wells

(57) ABSTRACT

Visualizations of a serial process are provided. A process model of a serial process is constructed using an underlying statististical model. The process model represents each instance of the serial process as a series of interconnected nodes, wherein (i) the serial process includes a plurality of events; (ii) each node is associated with an event and a time at which the associated event occurred in an instance of the serial process; and (iii) connectors link nodes together to form the series of interconnected nodes, the connectors representing stages of serial process. The stages are scored and categorized into various categories based, at least in (Continued)

part, on the process model. One or more of the categories is associated with outlier stages. A visualization of the process model is presented such that the visualization associates the stages of the instances of serial process with respective categories.

20 Claims, 7 Drawing Sheets

(56) References Cited

U.S. PATENT DOCUMENTS

| | | | | |
|---|---|---|---|---|
| 8,918,430 | B2* | 12/2014 | Fischer | G06Q 10/06 707/793 |
| 9,577,897 | B2* | 2/2017 | Dontcheva | H04L 43/045 |
| 9,881,257 | B2* | 1/2018 | Peppel | G06F 3/0484 |
| 2005/0222881 | A1 | 10/2005 | Booker | |
| 2005/0265083 | A1* | 12/2005 | Perry | G06Q 10/06 365/189.07 |
| 2006/0058898 | A1 | 3/2006 | Emigholz et al. | |
| 2009/0262131 | A1* | 10/2009 | Suntinger | G06Q 10/06 345/619 |
| 2011/0106289 | A1 | 5/2011 | Efendic et al. | |
| 2011/0288837 | A1 | 11/2011 | Blevins et al. | |
| 2013/0038612 | A1 | 2/2013 | Hanumara et al. | |
| 2013/0152041 | A1 | 6/2013 | Hatfield et al. | |
| 2014/0074260 | A1 | 3/2014 | Schroeder et al. | |
| 2014/0096249 | A1 | 4/2014 | Dupont et al. | |
| 2014/0310226 | A1* | 10/2014 | Marianetti, II | G06N 20/00 706/48 |
| 2015/0029193 | A1* | 1/2015 | Krajec | G06T 11/206 345/440 |
| 2017/0148195 | A1 | 5/2017 | Bak et al. | |

OTHER PUBLICATIONS

Sternberg, Saul, "Sequential Processes and the Shapes of Reaction-Time Distributions", University of Pennsylvania, printed on Sep. 9, 2015, pp. 1-5, <http://www.psych.upenn.edu/~saul/RTshape.invariance.not.pdf>.

Bak et al., "Visualizing Temporal Aspects of Serial Processes", U.S. Appl. No. 14/845,810, 42 pages, filed Nov. 19, 2015.

Appendix P, List of IBM Patents or Patent Applications Treated As Related, 2 pages, dated Dec. 1, 2015.

Couchet et al., "A Novel Architecture for the Classification and Visualization of Sequential Data", Adaptive and Natural Computing Algorithms, 8th International Conference, ICANNGA 2007, Warsaw, Poland, Apr. 11-14, 2007, Proceedings, Part I, pp. 1-5, DOI 10.1007/978-3-540-71618-1 81, Springer Berlin Heidelberg, Copyright 2007.

Nagem et al., "Operational Effectiveness and Predictive Maintenance Analytics Driven by IBM PMQ" (PowerPoint Presentation), IBM Insight2014, The Conference for Big Data and Ananlytics, © 2014 IBM Corporation, pp. 1-46, Grace Period Disclosure.

Rogge-Solti et al., "Temporal Anomaly Detection in Business Processes", This work was partially supported by the European Union's Seventh Framework Programme, (FP7/2007-2013) grant 612052 (SERAMIS), © Springer International Publishing Switzerland 2014, <http://rd.springer.com/chapter/10.1007/978-3-319-10172-9_15>, pp. 234-249.

* cited by examiner

VISUALIZATION OF SERIAL PROCESSES

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) Operational Effectiveness and Predictive Maintenance Analytics Driven by IBM PMQ; William Nagem, Shefali Bansal, Jonathan Bnayahu, and Alexandre Dalmax; presented Oct. 29, 2014 at the IBM Insight 2014 Conference; pages 20-28.

TECHNICAL FIELD OF THE INVENTION

The present invention relates generally to the field of information visualization, and more particularly to visualizing temporal aspects of serial processes.

BACKGROUND OF THE INVENTION

The field of information visualization has emerged from research in human-computer interaction, computer science, graphics, visual design, psychology, and business methods. It is increasingly applied as a critical component in scientific research, digital libraries, data mining, financial data analysis, market studies, manufacturing production control, and drug discovery.

Information visualization presumes that visual representations and interaction techniques take advantage of the human eye's broad bandwidth pathway into the mind to allow users to see, explore, and understand large amounts of information at once by detecting patterns. Information visualization focused on the creation of approaches for conveying abstract information in intuitive ways.

SUMMARY

According to one embodiment of the present disclosure, a method is provided. The method includes constructing, by one or more computer processors, a process model of a serial process based, at least in part, on an underlying statistical model, the process model representing each of one or more instances of the serial process as a series of interconnected nodes, wherein: the serial process includes one or more events; each node is associated with an event of the one or more events and a time at which the associated event occurred in an instance of the serial process; and connectors link nodes together to form the series of interconnected nodes, the connectors representing stages of the one or more instances of the serial process; scoring, by one or more computer processors, the stages of the one or more instances of the serial process based, at least in part, on the process model; categorizing, by one or more computer processors, the stages of the one or more instances of the serial process into a category of a plurality of categories based, at least in part, on the process model, wherein one or more of the plurality of categories are associated with outlier stages; and presenting, by one or more computer processors, a visualization of the process model such that the visualization associates the stages of the one or more instances of the serial process with respective categories.

According to another embodiment of the present disclosure, a computer program product is provided. The computer program product comprises a computer readable storage medium and program instructions stored on the computer readable storage medium. The program instructions include program instructions to construct a process model of a serial process based, at least in part, on an underlying statistical model, the process model representing each of one or more instances of the serial process as a series of interconnected nodes, wherein: the serial process includes one or more events; each node is associated with an event of the one or more events and a time at which the associated event occurred in an instance of the serial process; and connectors link nodes together to form the series of interconnected nodes, the connectors representing stages of the one or more instances of the serial process; program instructions to score the stages of the one or more instances of the serial process based, at least in part, on the process model; program instructions to categorize the stages of the one or more instances of the serial process into a category of a plurality of categories based, at least in part, on the process model, wherein one or more of the plurality of categories are associated with outlier stages; and program instructions to present a visualization of the process model such that the visualization associates the stages of the one or more instances of the serial process with respective categories.

According to another embodiment of the present disclosure, a computer system is provided. The computer system includes one or more computer processors, one or more computer readable storage media, and program instructions stored on the computer readable storage media for execution by at least one of the one or more processors. The program instructions include program instructions to construct a process model of a serial process based, at least in part, on an underlying statistical model, the process model representing each of one or more instances of the serial process as a series of interconnected nodes, wherein: the serial process includes one or more events; each node is associated with an event of the one or more events and a time at which the associated event occurred in an instance of the serial process; and connectors link nodes together to form the series of interconnected nodes, the connectors representing stages of the one or more instances of the serial process; program instructions to score the stages of the one or more instances of the serial process based, at least in part, on the process model; program instructions to categorize the stages of the one or more instances of the serial process into a category of a plurality of categories based, at least in part, on the process model, wherein one or more of the plurality of categories are associated with outlier stages; and program instructions to present a visualization of the process model such that the visualization associates the stages of the one or more instances of the serial process with respective categories.

DETAILED DESCRIPTION

Data analysis is an important part of applied research and problem solving in industry. The most fundamental data analysis approaches are visualization (e.g., histograms, scatter plots, surface plots, tree maps, parallel coordinate plots), statistics (e.g., hypothesis test, regression, PCA), data mining (e.g., association mining), and machine learning methods (e.g., clustering, classification, decision trees). Among these approaches, information visualization, or visual data analysis, is the most reliant on the cognitive skills of human analysts, and allows the discovery of unstructured actionable insights that are limited only by human imagination and creativity. Information visualization is also a hypothesis generation scheme, which can be, and is typically followed by more analytical or formal analysis, such as statistical hypothesis testing.

Embodiments of the present disclosure recognize that visualizing serial processes can reveal insights about the processes and enable identification of root-causes of abnormal processes. To reduce costs, various companies (e.g., mining companies) collect data concerning serial processes. As used herein, a serial process is a process that includes several stages that are performed in order. While various instances of a serial process are expected to behave similarly, there are often variances between instances (e.g., variances in the temporal durations of one or more stages between instances) due, at least in part, to differing process configurations and/or factors/conditions. Companies often employ subject matter experts (SMEs) to analyze the serial process data to identify outliers and extract patterns from the data in order to improve the process by identifying root-causes of deviations from expected behavior. A typical data set, however, often describes dozens, hundreds, or thousands of instances of a serial process. In general, it is difficult for SMEs to extract useful information from such large data sets. Embodiments of the present disclosure provide visualizations of serial process data sets that include analyses of the data based, at least in part, on statistical models of the serial processes to enable SMEs to identify root causes of abnormal processes.

Figure 1:
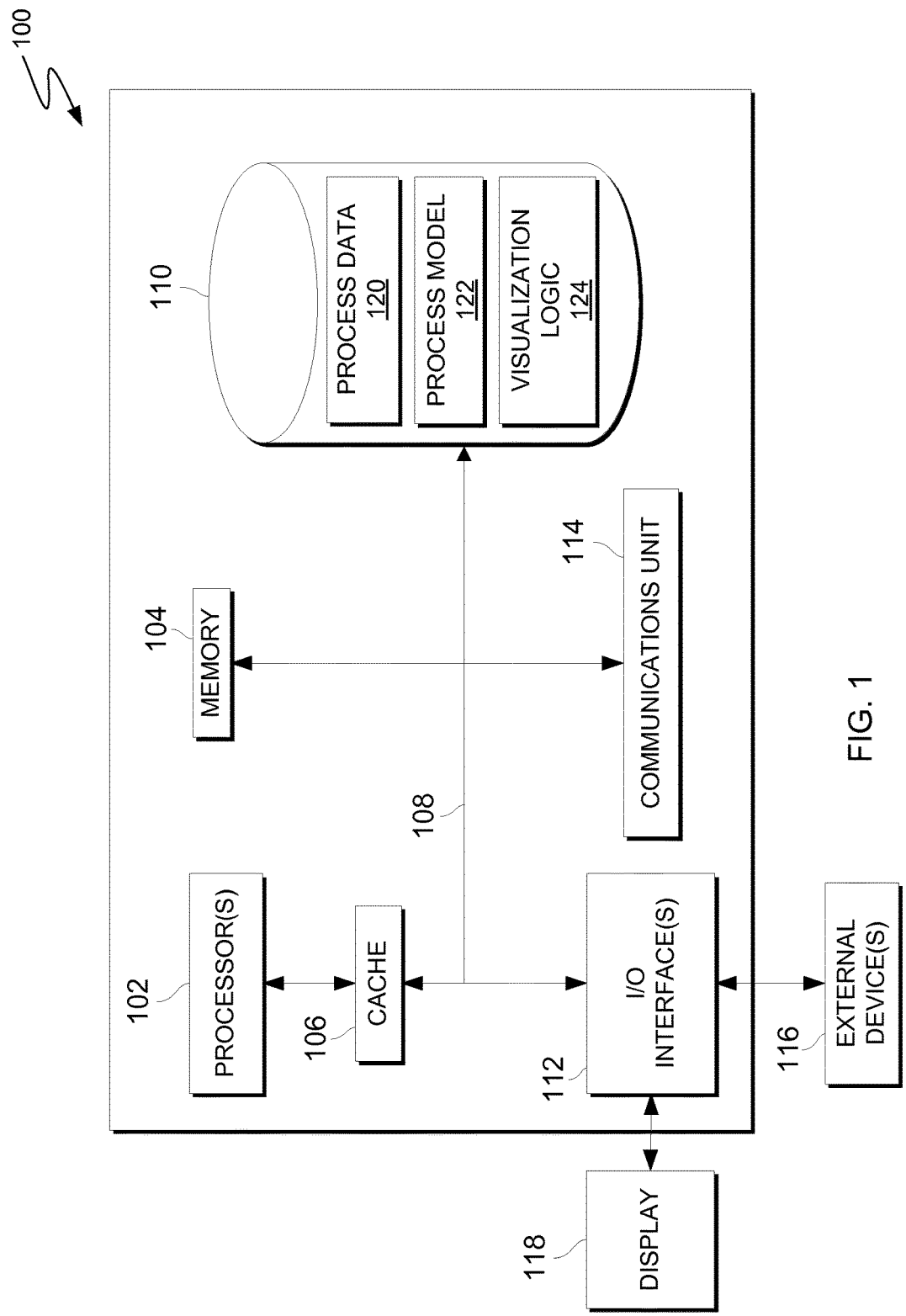
FIG. 1 is a block diagram of a computer system, in accordance with an embodiment of the present disclosure.

The present disclosure will now be described in detail with reference to the Figures. FIG. 1 is a block diagram of a computer system, in accordance with an embodiment of the present disclosure. In various embodiments, computer system 100 is a computing device that can be a standalone device, a server, a laptop computer, a tablet computer, a netbook computer, a personal computer (PC), or a desktop computer. In another embodiment, computer system 100 represents a portion of a computing system utilizing clustered computers and components to act as a single pool of seamless resources. In general, computer system can be any computing device or a combination of devices with access to process data 120 and process model 122, and with access to and/or capable of executing visualization logic 124.

Computer system 100 includes communications fabric 108, which provides communications between computer processor(s) 102, memory 104, persistent storage 110, communications unit 114, and input/output (I/O) interface(s) 112. Communications fabric 108 can be implemented with any architecture designed for passing data and/or control information between processors (such as microprocessors, communications and network processors, etc.), system memory, peripheral devices, and any other hardware components within a system. For example, communications fabric 108 can be implemented with one or more buses.

Memory 104 and persistent storage 110 are computer readable storage media. In various embodiments, memory 104 includes random access memory (RAM). In general, memory 104 can include any suitable volatile or non-volatile computer readable storage media. Cache 106 is a fast memory that enhances the performance of processors 102 by holding recently accessed data and data near accessed data from memory 104.

Program instructions and data can be stored in persistent storage 110 for execution and/or access by one or more of processor(s) 102 via cache 106 and memory 104. In the embodiment depict in FIG. 1, process data 120, process model 122, and visualization logic 124 are in persistent storage 110 of stored computer system 100. In some embodiments, one or more of process data 120, process model 122, and visualization logic 124 can reside on another computing device, provided that processor(s) 102 and/or various other components of computer system 100 can access and are accessible by process data 120, process model 122, and visualization logic 124. In other embodiments, one or more of process data 120, process model 122, and visualization logic 124 is provided locally on persistent storage 110 (e.g., via a disk drive or universal serial bus (USB) port) in the form of removable computer data storage media (e.g., a compact disk (CD), a digital versatile disc (DVD), USB drive, and/or an external hard disk drive). In yet other embodiments, one or more of process data 120, process model 122, and visualization logic 124 can be stored externally and accessed through a communication network. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will enable computer system 100 to have access to process data 120 and process model 122 and execute visualization logic 124, in accordance with various embodiments of the present disclosure. As described herein, processor(s) 102 execute visualization logic 124 to present various visualizations of process data 120 based, at least in part, on process model 122.

Process data 120 is data that describes a serial process (e.g., completion times of various stages for each instance of the serial process). Process data 120 allows for the construction of a statistical model of a serial process. In some embodiments, process data 120 includes data that represents factor(s) that are associated with various instances of the serial process. The factors can include, for example, one of more process characteristics such as the persons, the type of equipment, the type of material, the material weight, or the distances involved in the serial process.

Process model 122 is a statistical model of stages of a serial processes that is based, at least in part, on process data 120. Process model 122 is constructed, at least in part, from process data 120, as described herein with respect to FIG. 2.

Communications unit 114, in these examples, provides for communications with other data processing systems or devices. In these examples, communications unit 114 includes one or more network interface cards. Communications unit 114 may provide communications through the use of either or both physical and wireless communications links. Program instructions and data used to practice embodiments of the present invention may be downloaded to persistent storage 110 through communications unit 114.

I/O interface(s) 112 allows for input and output of data with other devices that may be connected to each computer system. For example, I/O interface 112 may provide a connection to external devices 116 such as a keyboard, keypad, a touch screen, and/or some other suitable input device. External devices 116 can also include portable computer readable storage media such as, for example, thumb drives, portable optical or magnetic disks, and memory cards. Software and data used to practice embodiments of the present invention can be stored on such portable computer readable storage media and can be loaded onto persistent storage 110 via I/O interface(s) 112. I/O interface(s) 112 also connect to a display 118.

Display 118 provides a mechanism to display data to a user and may be, for example, a computer monitor.

It should be appreciated that FIG. 1 provides only an illustration of one implementation and does not imply any limitations with regard to the environments in which different embodiments may be implemented. Many modifications to the depicted environment can be made without departing from the scope of the present disclosure.

Figure 2:
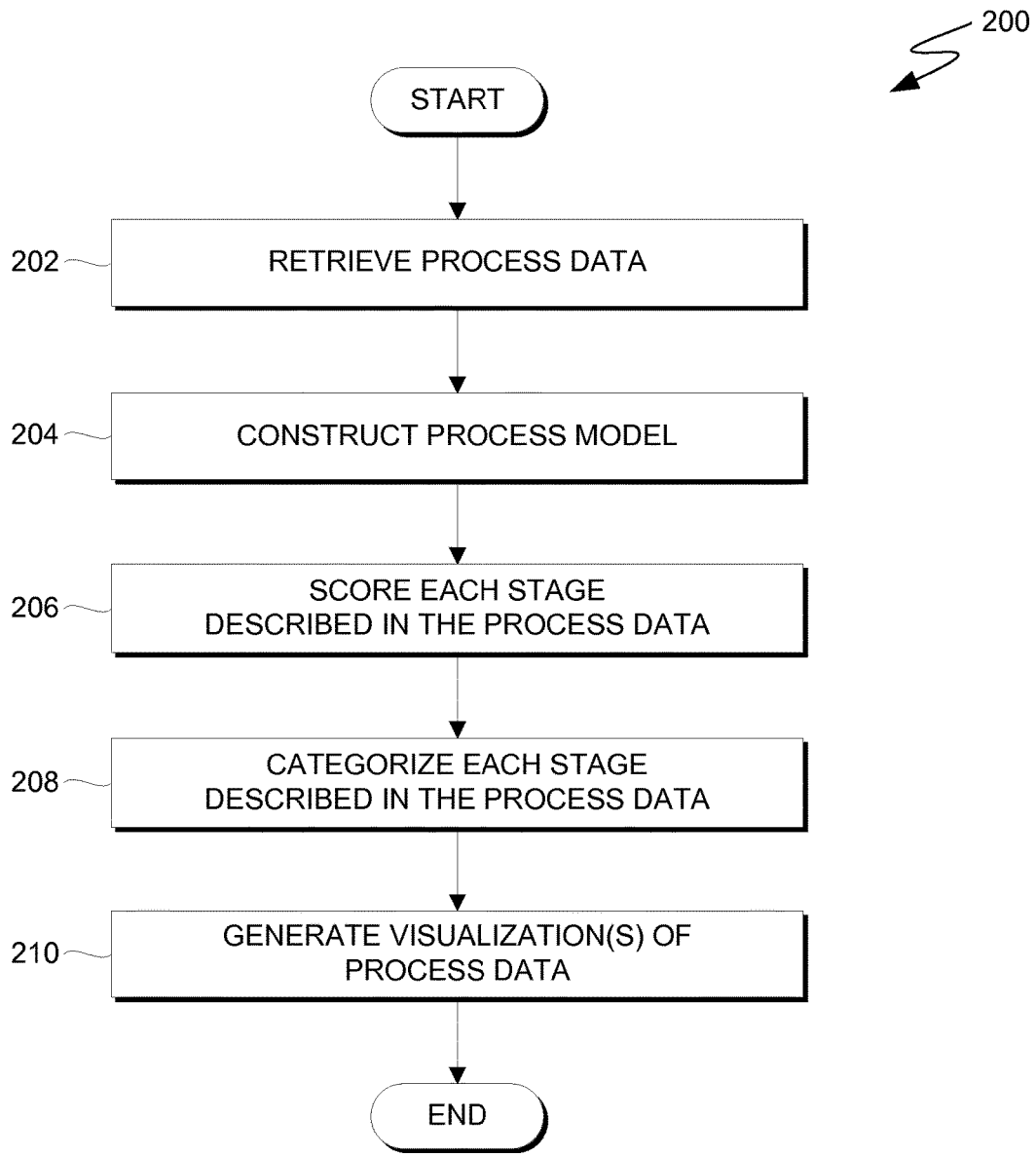
FIG. 2 is a flowchart depicting operations for visualizing a serial process, in accordance with an embodiment of the present disclosure.

FIG. 2 is a flowchart depicting operations of visualization logic 124, in accordance with an embodiment of the present disclosure. For example, FIG. 2 is a flowchart depicting operations 200 of visualization logic 124 as executed on computer system 100.

In operation 202, visualization logic 124 retrieves process data 120 from persistent storage 110.

In operation 204, visualization logic 124 constructs process model 122 based, at least in part, on process data 120 and an underlying statistical model. The underlying statistical model can be either parametric or non-parametric, depending on the nature of process data 120. Parametric models may be appropriate when variation in stage durations of process data 120 can be explained by external variables such as rain, spatial or temporal factors. Examples of parametric models include, but are not limited to, linear and non-linear regression, neural networks, and autoregressive time-series models. Non-parametric models may be appropriate when stage durations of process data 120 do not demonstrate clear relationships with external variables or factors. In non-parametric models, averages, variances, and the distribution of durations may be analyzed and calculated directly from the data without assuming any parametric forms. Examples of non-parametric models include boxplots and kernel density estimation. In various embodiments, process model 122 includes one or more averages that describe the average duration(s) of respective groups of stages (e.g., an average duration in rainy conditions and an average duration in dry conditions for each type of stage described in process data 120).

In operation 206, visualization logic 124 scores each stage that is described in process data 120 (e.g., a duration of each stage or a variance or a standard deviation that relates the duration of a stage to an average duration of a plurality of other stages is calculated) based, at least in part, on process model 122. In some embodiments, each stage is scored based, at least in part, on an average duration of all stages described by process data 120. In other embodiments, stages are scored based, at least in part, on an average duration that is calculated from among stages that are associated with the same set of factors.

In operation 208, visualization logic 124 categorizes each stage that is described in process data 120 based, at least in part, on the scores determined in operation 206 to identify, for example, outlier stages. In various embodiments, process model 122 provides one or more upper thresholds and/or one or more lower thresholds that visualization logic 124 uses to determine whether scores (and/or another property of the stages) that fall above or below the thresholds are outlier stages. In one example, visualization logic 124 determines whether stage durations that fall above or below the thresholds respectively correspond to slower or faster than average stage durations. These thresholds can be based on confidence or prediction intervals as determined by the underlying statistical model. In some embodiments, for example, a 90% confidence/prediction interval threshold is used to identify moderately faster-than-normal stages while a 99% confidence/prediction interval threshold is used to identify much faster-than-normal stages. In other embodiments, a threshold is chosen based on a boxplot definition of outliers, wherein an outlier is any value that lies more than one and a half times the length of a box from either end of the box. In addition, some embodiments of process model 122 include predefined patterns (e.g., the order of the stages in the serial process or factors that are known to cause outliers/anomalies) that are based, at least in part, on the behavior of the overall serial process and/or individual stages of the serial process. In one example of such an embodiment, process model 122 is constructed by identifying the factors that influence the stage durations and training multiple linear regression models on the relevant portions of process data 120. The trained linear regression models are then used to provide prediction intervals of increasing coverage, which are used in the scoring process and in determining outlier ordinal categories, as described herein.

In operation 210, visualization logic 124 generates one or more visualizations of the process data. As discussed herein with respect to FIG. 4, one or more of the visualizations can include a categorical scheme that visually distinguishes various stages based, at least in part, on the categorization performed in operation 208. In some embodiments, users of computer system 100 (e.g., SMEs) can select from among a plurality of visualizations in order to analyze process data 120 using the visualizations generated in operation 210.

FIGS. 3 through 7 depict examples of visualizations that visualization logic 124 can generate for presentation on display 118. In FIGS. 3 through 7, a data set that describes operations in a mining site is visualized, at least in part. This data set describes a large number of instances of a serial process. Specifically, the data set includes data that describes instances of the serial process of loading trucks with excavated material and dumping it, as discussed in greater detail with respect to FIGS. 3 through 7.

Figure 3:
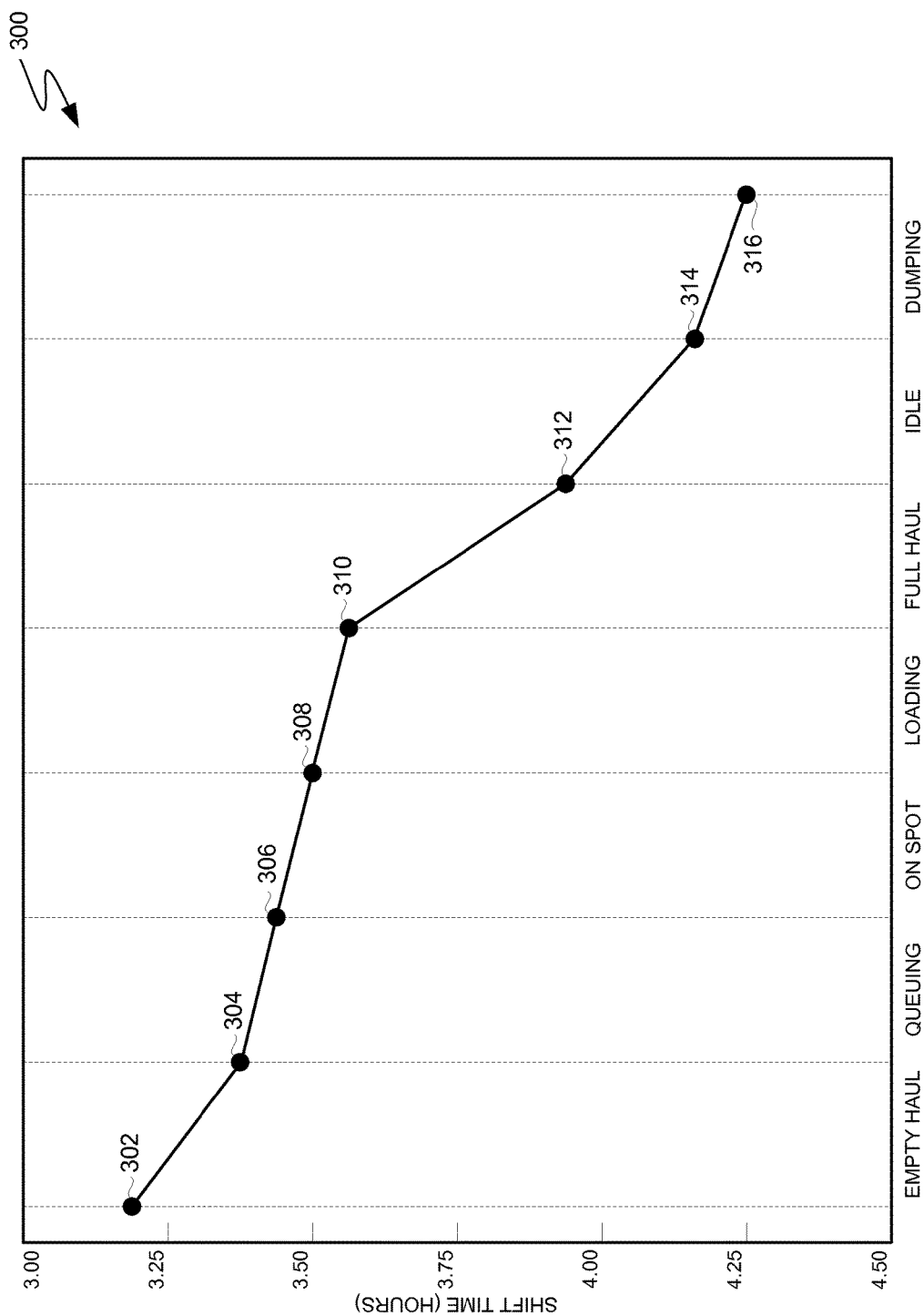
FIG. 3 is graph that depicts a visualization of one instance of a serial process, in accordance with an embodiment of the present disclosure.

FIG. 3 is graph that depicts a visualization of one instance of a serial process, in accordance with an embodiment of the present disclosure. Specifically, FIG. 3 depicts cycle-time visualization 300, which is an example of one instance of a serial hauling process. A cycle-time visualization, as depicted in FIG. 3, includes the various stages of a serial process, in order of performance, along the x-axis and units of time along the y-axis. In the embodiment depicted in FIG. 3, duration of the shift represented by the y-axis increases from top to bottom. Other coordinate systems, however, can be used without departing from the scope of the present disclosure. In general, each stage in the serial process is defined by a first event (i.e., the start of the stage) and a second event (i.e., the end of the stage). To generate the cycle-time visualization, nodes are plotted for each instance of the serial process. Each node represents an event and the time at which the event occurred. The nodes of each instance of the serial process are connected, in order of performance, to visualize the instance of the serial process as a curve in the cycle-time visualization.

In FIG. 3, for example, cycle-time visualization 300 depicts one instance of a serial hauling process (i.e., the progress of a single hauling truck) as a series of interconnected node/events. In this example, node 302 represents the beginning of an empty haul (e.g., the end of dumping excavated material during a previous instance or the beginning of a new cycle) and node 304 represents the arrival of the truck in the loading area. The line connecting nodes 302 and 304 represents an empty-hauling stage. Node 306 represents the arrival of the truck at the loading spot, and the line connecting nodes 304 and 306 represents a queuing stage. Node 308 represents the time that loading of the truck begins, and the line connecting nodes 306 and 308 represents an on-spot stage. Node 310 represents the time that loading of the truck ends, and the line connecting nodes 308 and 310 represents a loading stage. Node 312 represents the arrival of the truck at a dumping location, and the line connecting nodes 310 and 312 represents a full-hauling stage. Node 314 represents the time that dumping begins, and the line connecting nodes 312 and 314 represents an idle stage. Node 316 represents the time that dumping ends, and the line connecting nodes 314 and 316 represents a dumping stage. In some cases, the time that dumping ends is also the start of an empty-hauling stage for another instance of the serial process (i.e., the truck beings a new hauling cycle). For each stage of an instance of a serial process, the duration of a stage is reflected in the difference in y-axis coordinates of the nodes that define the stages.

Figure 4:
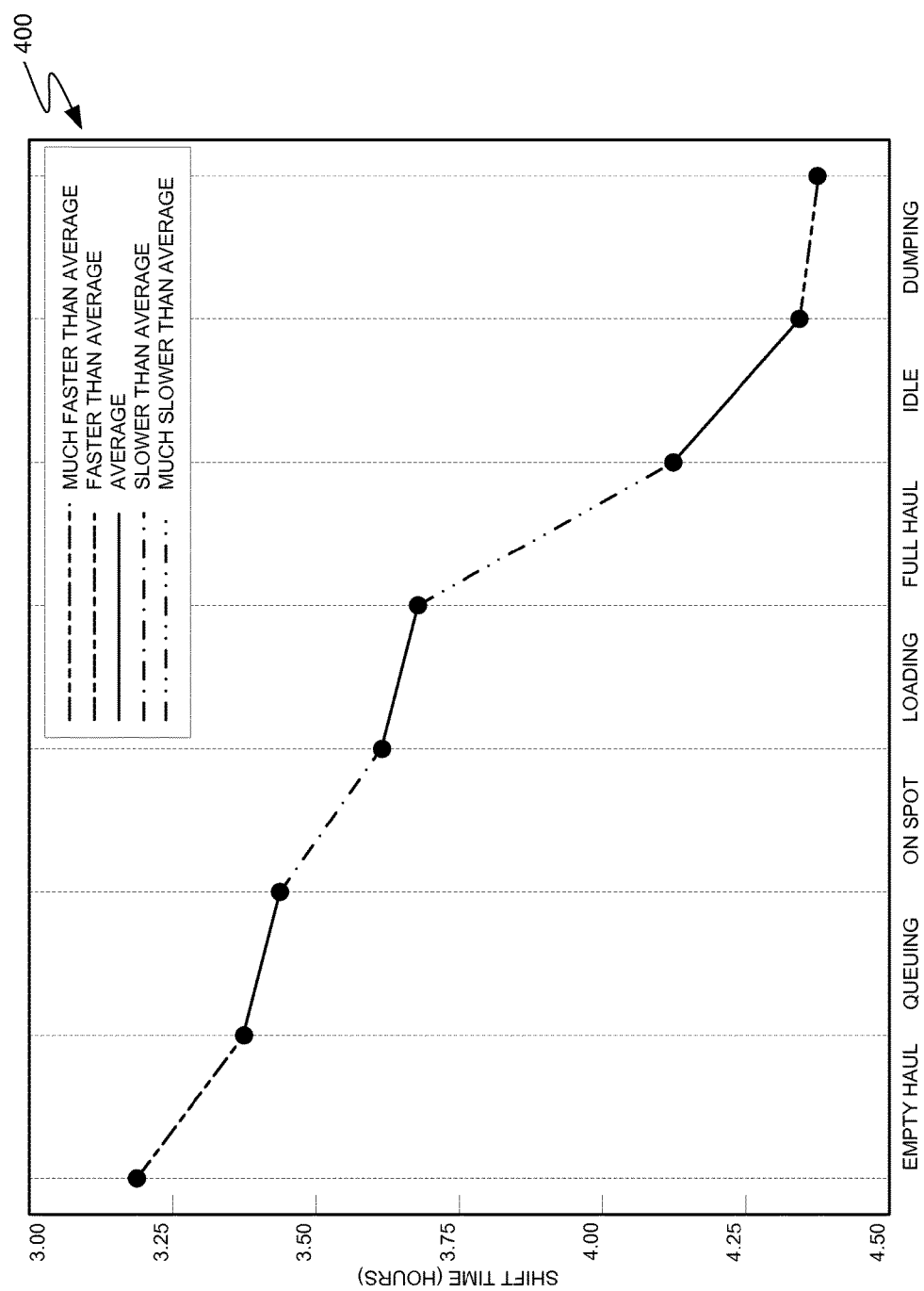
FIG. 4 is graph that depicts statistical information on a visualization of one instance of a serial process, in accordance with an embodiment of the present disclosure.

FIG. 4 is graph that depicts statistical information on a visualization of one instance of a serial process, in accordance with an embodiment of the present disclosure. Specifically, cycle-time visualization 400 is a visualization of another instance of the serial process described with respect to FIG. 3, in which deviations of the stages from respective averages are represented using a categorical scheme (i.e., the patterns of the lines that represent the stages). For example, the pattern of the line segment (i.e. connectors) that represents the empty-hauling stage in cycle-time visualization 400 indicates that this instance of an empty-hauling stage was faster than the average duration of other instances of empty-hauling stages. In some embodiments, the duration of the empty-hauling stage depicted in cycle-time visualization 400 is compared against the average duration of all empty-hauling stages in process data 120. In other embodiments, the empty-hauling stage depicted in cycle-time visualization 400 is associated with one or more factors, and the duration of the stage is compared against the average duration of empty-hauling stages that are associated with the same external factor(s) (e.g., the average duration of hauling cycles performed on the same route and/or same mine conditions).

Figure 5:
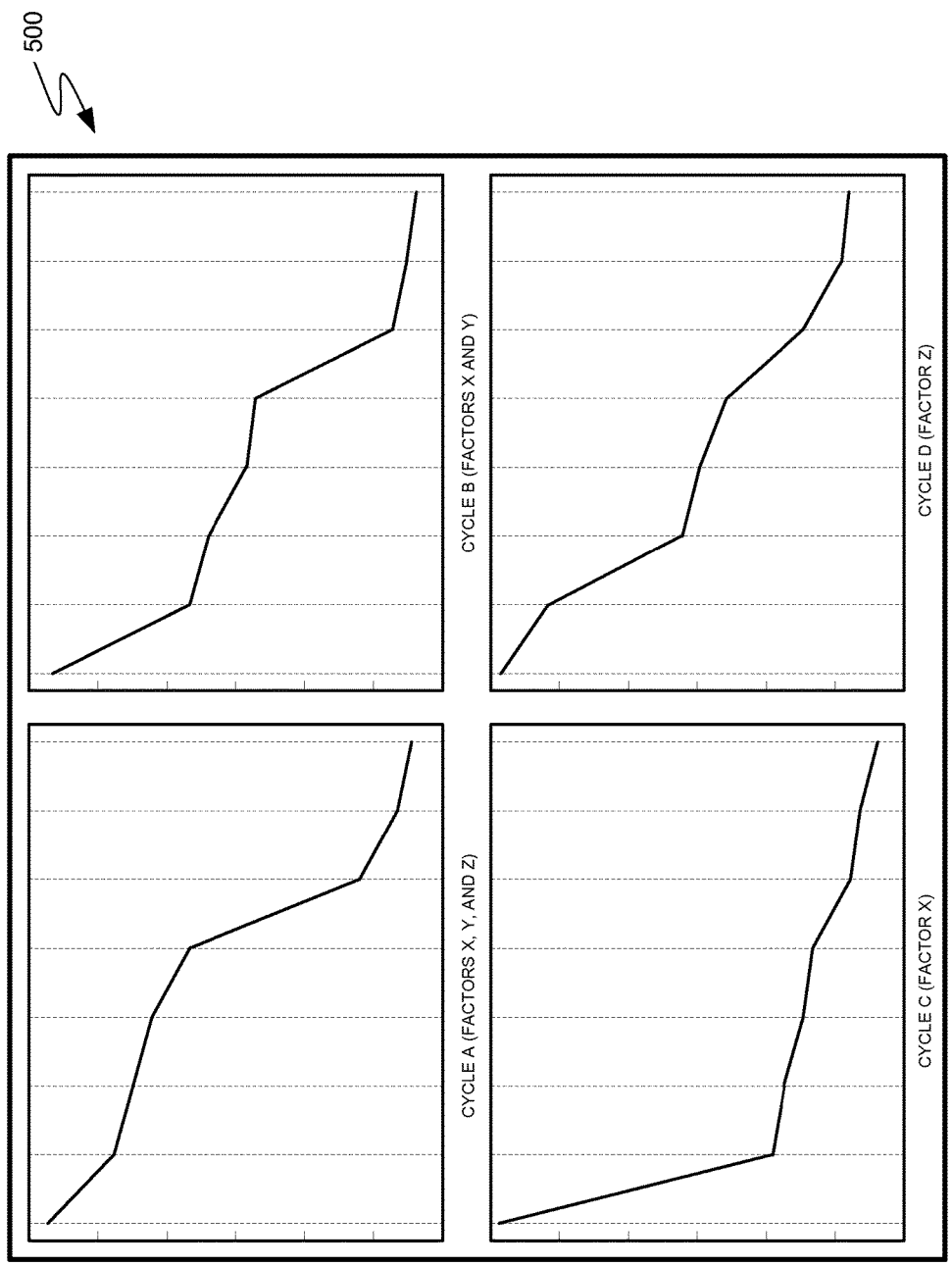
FIG. 5 is a visualization of multiple instances of a serial process, in accordance with an embodiment of the present disclosure.
Figure 6:
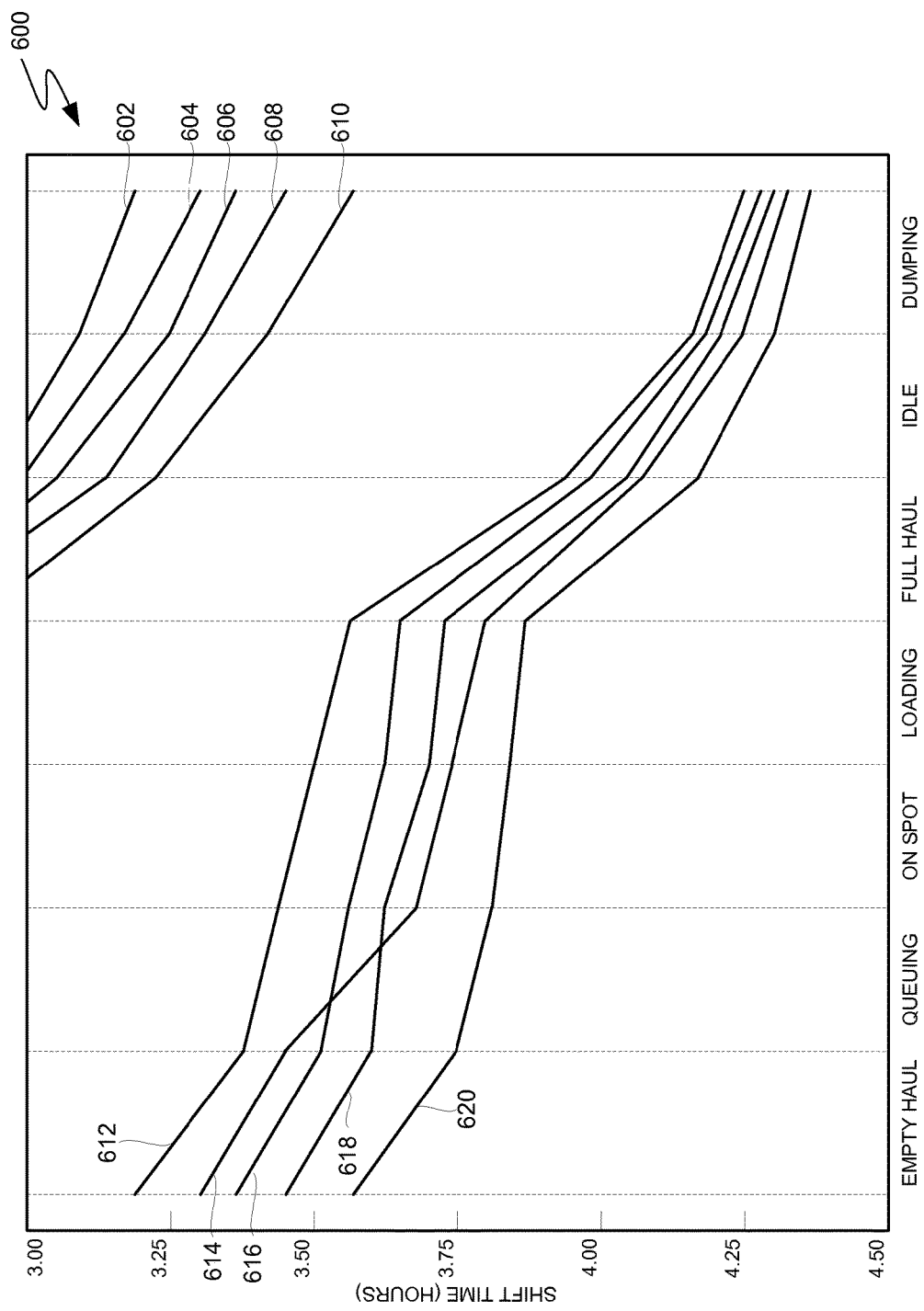
FIG. 6 is a visualization of a cluster of instances of a serial process, in accordance with an embodiment of the present disclosure.
Figure 7:
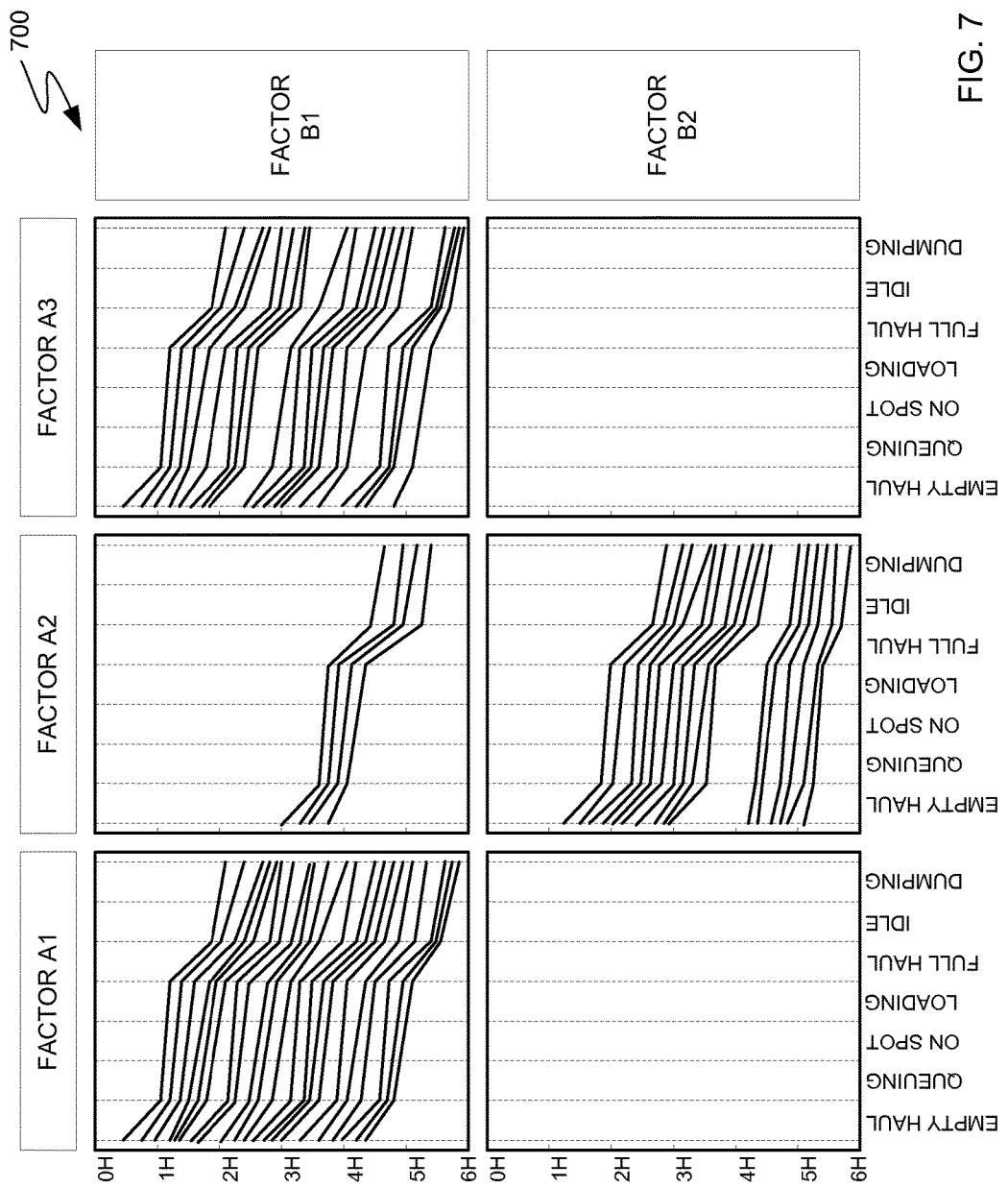
FIG. 7 is a visualization of multiple instances of a serial process in which the instances are stratified by one or more external variables, in accordance with an embodiment of the present disclosure.

To generate cycle-time visualization 400, the duration of each stage of the serial process is compared to an average duration of the respective stages and categorized into one of five ordinal categories (i.e., much slower than normal, slower than normal, average, faster than average, or much faster than average). In the embodiment depicted in FIG. 4, various thresholds differentiate the categories. In general, one or more categories are associated with outlier stages. For example, a first upper threshold differentiates average durations from faster than average durations, a second upper threshold differentiates faster than average durations from much faster than average durations, a first lower threshold differentiates average durations from slower than average durations, and a second lower threshold differentiates slower than average durations from much slower than average durations. Visualization logic 124 compares the duration of each stage to these thresholds to categories each stage. In embodiments like the one depicted in FIG. 4, the patterns of the line segments (that represent the stages indicate whether the respective stages are outliers, and if so, the extent that the respective stages deviate from the average duration. In other embodiments, the color of the line segments (i.e., connectors) that represent the stages indicate this information. In yet other embodiments, other visual indicators and/or a combination of visual indicators (e.g., stroke width, line type, connection type, icons or isomorphic representation) is used to encode the ordinal categories. FIGS. 5, 6, and 7 depict other visualizations of the serial process depicted in FIG. 4. While FIGS. 5, 6, and 7 omit the categorical scheme depicted in FIG. 4 for illustrative simplicity, any visualization of a serial process described herein can incorporate the categorical scheme as described with respect to FIG. 4.

FIG. 5 is a visualization of multiple instances of a serial process, in accordance with an embodiment of the present disclosure. Specifically, visualization 500 depicts four instances of a serial process as a group of four cycle-time visualizations, in which each cycle-time visualization depicts a different instance of the serial process. Visualization 500 enables a user of computer system 100 (e.g., a SME) to compare the shapes of the curves that represent the instances of the serial process. In the embodiment depicted in FIG. 5, for example, each cycle-time visualization identifies the instance of the serial process that is depicted (e.g., Cycle A) and the factors that are associated with the instance (e.g., factors x, y, and z). Having knowledge of the associated factors can enable a user of computer system 100 (e.g., a SME) to score performance in order to identify patterns and/or root causes of anomalies/outliers (i.e., if visualization 500 includes a classification scheme like the one depicted in FIG. 4) by cross-referencing differences in the shapes of the curves with differences in the factors that are associated with the various instances of the serial process.

FIG. 6 is a visualization of a cluster of instances of a serial process, in accordance with an embodiment of the present disclosure. Specifically, cycle-time visualization 600 visualizes the hauling cycles (i.e., iterations of a serial hauling process) of several trucks that are working concurrently. For example, curves 602 and 612 describe the work of a first truck, curves 604 and 614 describe the work of a second truck, curves 606 and 616 describe the work of a third truck, curves 608 and 618 describe the work of a fourth truck, and curves 610 and 620 describe the work of a fifth truck. As depicted by each pair of curves, one iteration of the hauling cycle ends and a subsequent iteration of the hauling cycle begins when a truck reaches the end of the dumping stage. In some embodiments, instances of serial processes tend to cluster when a "working rhythm" is reached. A working rhythm is a situation in which the time interval between the same events and/or stages in multiple instances of a serial process approximates a regular value (i.e., a low variance exists). Visualizations like cycle-time visualization 600 are useful for detecting deviations from a working rhythm. In FIG. 6, for example, curves 614, 616, and 618 depict a cross-process in which the second truck begins the queuing stage before the third and fourth trucks but does not begin the on-spot stage until after the third and fourth trucks. This cross-process causes a temporary breakdown of the working rhythm (i.e., the working rhythm is re-established in subsequent stages). Using one or more of the other visualizations described herein, a user of computer system 100 (e.g., a SME) may be able to determine the root cause of the deviation by analyzing the factors that are associated with curves 612, 614, 616, 618 and/or 620. In addition, the categorical scheme depicted in FIG. 4 can be overlaid on cycle-time visualization 600 to provide additional context for the instances of the serial hauling processes depicted in FIG. 6.

FIG. 7 is a visualization of multiple instances of a serial process in which the instances are stratified by one or more of external variables, in accordance with an embodiment of the present disclosure. Specifically, visualization 700 depicts how a serial process, as represented in a plurality of cycle-time visualizations, is affected by a first type of factor (e.g., factors A1, A2, and A3) and a second type of factor (e.g., factors B1 and B2). In one example of a first type of factor, factors A1, A2, and A3 represent different fleets of trucks (e.g., a first fleet, a second fleet, and a third fleet respectively). In another example of a first type of factor, factors A1, A2, and A3 represent different loading or dumping locations. In one example of a second type of factor, factors B1 and B2 represent rainy and dry operating conditions in a mine. In another example of a second type of factor, factors B1 and B2 represent a first type of truck and a second type of truck. Persons of ordinary skill in the art will understand that the number factors (i.e., the number of A-type factors and the number of B-type factors) depends on the nature of the factors and whether or not the one or more of the factors is represented in process data 120. In other embodiments of visualization 700, a single type of factor is depicted (e.g., A-type factors are excluded). In one example of such an embodiment, cycle-time visualizations are stratified based on whether the weather conditions were rainy or dry. In addition, the classification scheme depicted in FIG. 4 can be overlaid on visualization 700 to provide additional context for the instances of the serial hauling processes depicted in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

As used herein, a list of alternatives such as "at least one of A, B, and C" should be interpreted to mean "at least one A, at least one B, at least one C, or any combination of A, B, and C."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
constructing, by one or more computer processors, a process model of a serial hauling process based, at least in part, on an underlying statistical model, the process model representing each of one or more instances of the serial hauling process as a series of interconnected nodes, wherein:
the serial hauling process includes one or more events that are performed in order to represent a sequence of load-hauling stages at a mining site, each instance of the serial hauling process representing a respective truck operating at the mining site;
each node is associated with a respective event of the one or more events, a time at which the associated event occurred in a respective instance of the serial hauling process, and the truck represented by the respective instance of the serial hauling process, each event representing at least one of the truck at an end of a respective prior stage in the sequence of load-hauling stages and the truck at a beginning of a respective next stage in the sequence of load-hauling stages;
connectors link nodes together to form the series of interconnected nodes, the connectors representing respective stages of the one or more instances of the serial hauling process, and each connector representing the truck performing a stage of the respective instance of the serial hauling process represented by the linked nodes; and
each load-hauling stage of the one or more instances of the serial hauling process corresponding to a respective stage type, each stage type representing activity occurring between a respective pair of sequential events of the one or more events of the serial hauling process;
scoring, by one or more computer processors, each load-hauling stage of the one or more instances of the serial hauling process, each load-hauling stage receiving a score based, at least in part, on the process model and a respective stage duration;
categorizing, by one or more computer processors, each load-hauling stage of the one or more instances of the serial hauling process into a respective category of a plurality of categories for the respective stage type based, at least in part, on the process model and the respective score, wherein (i) the plurality of categories are differentiated by one or more thresholds that represent respective score values, (ii) each category represents a range of score values, and (iii) one or more of the plurality of categories are associated with outlier stages within each stage type;
receiving, by one or more computer processors, data that describes the serial hauling process, wherein the data that describes the serial process associates the one or more instances of the serial hauling process with a first type of factor represented by a first set of characteristics at the mining site and a second type of factor represented by a second set of characteristics at the mining site;
presenting on a computer display, by one or more computer processors, a plurality of cycle-time visualizations of the process model such that (i) each cycle-time visualization presents a respective instance of the serial hauling process as a curve representing each respective node and each respective connector of the respective instance of the serial hauling process to describe the respective truck at each event and at each stage of the sequence of load-hauling stages at the mining site, (ii) each cycle-time visualization visually associates the stages of the respective instance of the serial hauling process with respective categories such that the plurality of cycle-time visualizations provides a comparison of the one or more instances of the serial hauling process that identifies one or more outlier load-hauling stages within the one or more instances of the serial hauling process; and responsive to identifying, within the presented plurality of cycle-time visualizations, a cross-process indicating a breakdown of a working rhythm of a plurality of trucks performing the sequence of load-hauling stages at the mining site, stratifying on the computer display, by one or more computer processors, the plurality of cycle-time visualizations of the one or more instances of the serial hauling process based, at least in part, on the first type of factor at the mining site and the second type of factor at the mining site to identify a root cause for the breakdown of the working rhythm based on at least one of the first type of factor and the second type of factor, the plurality of cycle-time visualizations stratified such that the plurality of cycle-time visualizations are visually grouped based on shared associations with characteristics in the first set of characteristics and shared associations with characteristics in the second set of characteristics, wherein each cycle-time visualization is respectively associated with one characteristic in the first set of characteristics and one characteristic in the second set of characteristics.

2. The method of claim 1, wherein each cycle-time visualization differentiates the plurality of categories using visual indicators including at least one of line patterns, line colors, line widths, connection types, and icons.

3. The method of claim 1, further comprising:
determining, by one or more computer processors, whether to use either a parametric model or a non-parametric model for the underlying statistical model based, at least in part, on one or more external variables or factors.

4. The method of claim 1, wherein:
constructing the process model includes determining, by one or more computer processors, an average stage duration for each stage type of the serial hauling process from among a plurality of instances of the serial hauling process;
scoring each load-hauling stage of the one or more instances of the serial hauling process includes comparing, by one or more computer processors, a duration of each load-hauling stage to the average stage duration of the respective stage type and scoring each load-hauling stage based on a respective comparison; and
categorizing each load-hauling stage of the one or more instances of the serial hauling process into a respective category includes responsive to comparing, by one or more computer processors, the score of a first stage of a first instance of the serial hauling process to at least on threshold of the one or more thresholds differentiating the plurality of categories within the respective stage type, identifying, by one or more computer processors, the first stage of the first instance of the serial hauling process as an outlier stage within the respective stage type based on the score of the first stage.

5. The method of claim 4, wherein the duration of the first stage in the first instance of the serial hauling process is compared to one or more thresholds that are longer than the average duration of the first stage and to one or more thresholds that are shorter than the average duration of the first stage.

6. The method of claim 1, wherein the sequence of load-hauling stages at the mining site comprise, in sequence, a first empty haul stage, a second queuing stage, a third on spot stage, a fourth loading stage, a fifth full haul stage, a sixth idle stage, and a seventh dumping stage, each truck, upon completing the seventh dumping stage while the mining site is operating, progressing to the first empty haul stage of a subsequent instance of the serial hauling process.

7. The method of claim 6, wherein the first type of factor is a fleet type comprising a first type of truck and a second type of truck and the second type of factor is a weather type comprising rainy operating conditions and dry operating conditions.

8. A computer program product comprising:
a computer readable storage device and program instructions stored on the computer readable storage device, the program instructions comprising:
program instructions to construct a process model of a serial hauling process based, at least in part, on an underlying statistical model, the process model representing each of one or more instances of the serial hauling process as a series of interconnected nodes, wherein:
the serial hauling process includes one or more events that are performed in order to represent a sequence of load-hauling stages at a mining site, each instance of the serial hauling process representing a respective truck operating at the mining site;
each node is associated with an event of the one or more events, a time at which the associated event occurred in a respective instance of the serial hauling process, and the truck represented by the respective instance of the serial hauling process, each event representing at least one of the truck at an end of a respective prior stage in the sequence of load-hauling stages and the truck at a beginning of a respective next stage in the sequence of load-hauling stages;
connectors link nodes together to form the series of interconnected nodes, the connectors representing respective stages of the one or more instances of the serial hauling process, and each connector representing the truck performing a stage of the respective instance of the serial hauling process represented by the linked nodes; and
each load-hauling stage of the one or more instances of the serial hauling process corresponding to a respective stage type, each stage type representing activity occurring between a respective pair of sequential events of the one or more events of the serial hauling process;
program instructions to score each load-hauling stage of the one or more instances of the serial hauling process, each load-hauling stage receiving a score based, at least in part, on the process model and a respective stage duration;
program instructions to categorize each load-hauling stage of the one or more instances of the serial hauling process into a respective category of a plurality of categories for the respective stage type based, at least in part, on the process model and the respective score, wherein (i) the plurality of categories are differentiated by one or more thresholds that represent respective score values, (ii) each category represents a range of score values, and (iii) one or more of the plurality of categories are associated with outlier stages within each stage type;
program instructions to receive by one or more computer processors, data that describes the serial hauling process, wherein the data that describes the serial process associates the one or more instances of the serial process with a first type of factor represented by a first set of characteristics at the mining site and a second type of factor represented by a second set of characteristics at the mining site;

program instructions to present, on a computer display, a plurality of cycle-time visualizations of the process model such that (i) each cycle-time visualization presents a respective instance of the serial hauling process as a curve representing each respective node and each respective connector of the respective instance of the serial hauling process to describe the respective truck at each event and at each stage of the sequence of load-hauling stages at the mining site, (ii) each cycle-time visualization visually associates the stages of the respective instance of the serial hauling process with respective categories such that the plurality of cycle-time visualizations provides a comparison of the one or more instances of the serial hauling process that identifies one or more outlier stages within the one or more instances of the serial hauling process; and program instructions to, responsive to identifying, within the presented plurality of cycle-time visualizations, a cross-process indicating a breakdown of a working rhythm of a plurality of trucks performing the sequence of load-hauling stages at the mining site, stratify, on the computer display, the plurality of cycle-time visualizations of the one or more instances of the serial hauling process based, at least in part, on the first type of factor at the mining site and the second type of factor at the mining site to identify a root cause for the breakdown of the working rhythm based on at least one of the first type of factor and the second type of factor, the plurality of cycle-time visualizations stratified such that the plurality of cycle-time visualizations are visually grouped based on shared associations with characteristics in the first set of characteristics and shared associations with characteristics in the second set of characteristics, wherein each cycle-time visualization is respectively associated with one characteristic in the first set of characteristics and one characteristic in the second set of characteristics.

9. The computer program products of claim 8, wherein each cycle-time visualization differentiates the plurality of categories using visual indicators including at least one of line patterns, line colors, line widths, connection types, and icons.

10. The computer program product of claim 8, the program instructions further comprising:

program instructions to determine whether to use either a parametric model or a non-parametric model for the underlying statistical model based, at least in part, on one or more external variables or factors.

11. The computer program product of claim 8, wherein:

the program instructions to construct the process model include program instructions to determine an average stage duration for each stage type of the serial hauling process from among a plurality of instances of the serial hauling process;

the program instructions to score each load-hauling stage of the one or more instances of the serial hauling process include program instructions to compare a duration of each load-hauling stage to the average stage duration of the respective stage type and score each load-hauling stage based on a respective comparison; and the program instructions to categorize each load-hauling stage of the one or more instances of the serial hauling process into a respective category include program instructions to compare the score of a first stage of a first instance of the serial hauling process to at least on threshold of the one or more thresholds differentiating the plurality of categories within the respective stage type, and in response, identify the first stage of the first instance of the serial hauling process as an outlier stage within the respective stage type based on the score of the first stage.

12. The computer program product of claim 11, wherein the duration of the first stage in the first instance of the serial hauling process is compared to one or more thresholds that are longer than the average duration of the first stage and to one or more thresholds that are shorter than the average duration of the first stage.

13. The computer program product of claim 8, wherein the sequence of load-hauling stages at the mining site comprise, in sequence, a first empty haul stage, a second queuing stage, a third on spot stage, a fourth loading stage, a fifth full haul stage, a sixth idle stage, and a seventh dumping stage, each truck, upon completing the seventh dumping stage while the mining site is operating, progressing to the first empty haul stage of a subsequent instance of the serial hauling process.

14. The computer program product of claim 13, wherein the first type of factor is a fleet type comprising a first type of truck and a second type of truck and the second type of factor is a weather type comprising rainy operating conditions and dry operating conditions.

15. A computer system comprising:

one or more computer processors;

one or more computer readable storage devices;

program instructions stored on the computer readable storage devices for execution by at least one of the one or more processors, the program instructions comprising:

program instructions to construct a process model of a serial hauling process based, at least in part, on an underlying statistical model, the process model representing each of one or more instances of the serial hauling process as a series of interconnected nodes, wherein:

the serial hauling process includes one or more events that are performed in order to represent a sequence of load-hauling stages at a mining site, each instance of the serial hauling process representing a respective truck operating at the mining site;

each node is associated with an event of the one or more events, a time at which the associated event occurred in a respective instance of the serial hauling process, and the truck represented by the respective instance of the serial hauling process, each event representing at least one of the truck at an end of a respective prior stage in the sequence of load-hauling stages and the truck at a beginning of a respective next stage in the sequence of load-hauling stages;

connectors link nodes together to form the series of interconnected nodes, the connectors representing respective stages of the one or more instances of the serial hauling process, and each connector representing the truck performing a stage of the respective instance of the serial hauling process represented by the linked nodes; and each load-hauling stage of the one or more instances of the serial hauling process corresponding to a respective stage type, each stage type representing activity occurring between a respective pair of sequential events of the one or more events of the serial hauling process;

program instructions to score each load-hauling stage of the one or more instances of the serial hauling process, each load-hauling stage receiving a score based, at least in part, on the process model and a respective stage duration;

program instructions to categorize each load-hauling stage of the one or more instances of the serial hauling process into a respective category of a plurality of categories for the respective stage type based, at least in part, on the process model and the respective score, wherein (i) the plurality of categories are differentiated by one or more thresholds that represent respective score values, (ii) each category represents a range of score values, and (iii) one or more of the plurality of categories are associated with outlier stages within each stage type;

program instructions to receive by one or more computer processors, data that describes the serial hauling process, wherein the data that describes the serial process associates the one or more instances of the serial process with a first type of factor represented by a first set of characteristics at the mining site and a second type of factor represented by a second set of characteristics at the mining site;

program instructions to present, on a computer display, a plurality of cycle-time visualizations of the process model such that (i) each cycle-time visualization presents a respective instance of the serial hauling process as a curve representing each respective node and each respective connector of the respective instance of the serial hauling process to describe the respective truck at each event and at each stage of the sequence of load-hauling stages at the mining site, (ii) each cycle-time visualization visually associates the stages of the respective instance of the serial hauling process with respective categories such that the plurality of cycle-time visualizations provides a comparison of the one or more instances of the serial hauling process that identifies one or more outlier stages within the one or more instances of the serial hauling process; and program instructions to, responsive to identifying, within the presented plurality of cycle-time visualizations, a cross-process indicating a breakdown of a working rhythm of a plurality of trucks performing the sequence of load-hauling stages at the mining site, stratify, on the computer display, the plurality of cycle-time visualizations of the one or more instances of the serial hauling process based, at least in part, on the first type of factor at the mining site and the second type of factor at the mining site to identify a root cause for the breakdown of the working rhythm based on at least one of the first type of factor and the second type of factor, the plurality of cycle-time visualizations stratified such that the plurality of cycle-time visualizations are visually grouped based on shared associations with characteristics in the first set of characteristics and shared associations with characteristics in the second set of characteristics, wherein each cycle-time visualization is respectively associated with one characteristic in the first set of characteristics and one characteristic in the second set of characteristics.

16. The computer system of claim 15, wherein each cycle-time visualization differentiates the plurality of categories using visual indicators including at least one of line patterns, line colors, line widths, connection types, and icons.

17. The computer system of claim 15, the program instructions further comprising:
program instructions to determine whether to use either a parametric model or a non-parametric model for the underlying statistical model based, at least in part, on one or more external variables or factors.

18. The computer system of claim 15, wherein:
the program instructions to construct the process model include program instructions to determine an average stage duration for each stage type of the serial hauling process from among a plurality of instances of the serial hauling process;
the program instructions to score each load-hauling stage of the one or more instances of the serial hauling process include program instructions to compare a duration of each load-hauling stage to the average stage duration of the respective stage type and score each load-hauling stage based on a respective comparison; and
the program instructions to categorize each load-hauling stage of the one or more instances of the serial hauling process into a respective category include program instructions to compare the score of a first stage of a first instance of the serial hauling process to at least on threshold of the one or more thresholds differentiating the plurality of categories within the respective stage type, and in response, identify the first stage of the first instance of the serial hauling process as an outlier stage within the respective stage type based on the score of the first stage.

19. The computer system of claim 15, wherein the sequence of load-hauling stages at the mining site comprise, in sequence, a first empty haul stage, a second queuing stage, a third on spot stage, a fourth loading stage, a fifth full haul stage, a sixth idle stage, and a seventh dumping stage, each truck, upon completing the seventh dumping stage while the mining site is operating, progressing to the first empty haul stage of a subsequent instance of the serial hauling process.

20. The computer system of claim 19, wherein the first type of factor is a fleet type comprising a first type of truck and a second type of truck and the second type of factor is a weather type comprising rainy operating conditions and dry operating conditions.

* * * * *